UNITED STATES PATENT OFFICE.

JOHN BRIAN BARRETT, OF ANNAPOLIS ROYAL, NOVA SCOTIA, CANADA.

INSECTICIDE.

1,230,648.   Specification of Letters Patent.   Patented June 19, 1917.

No Drawing.    Application filed August 4, 1916. Serial No. 113,199.

*To all whom it may concern:*

Be it known that I, JOHN B. BARRETT, a subject of Great Britain, residing at Annapolis Royal, in the Province of Nova Scotia, Canada, have invented certain new and useful Improvements in Insecticides; and I do hereby declare that the following is a full, clear, and exact description of the invention, such as will enable others skilled in the art to which it appertains to make and use the same.

The present invention relates to an insect destroyer and more particularly to an insecticide which will destroy insects which are detrimental to field crops or human beings and when applied will be non-poisonous to the human being or domestic animal or in any way affect the growing crops to which it is applied.

An object of the present invention is to provide an insecticide of the character aforesaid which when applied will have a continuous spontaneous evaporation throughout the life of the ingredients and which will through its entire life destroy insects.

The insecticide forming the subject-matter of the present invention consists generally of a filler of ground ashes, manure or some other inert substance of inexpensive nature having applied thereto a volatile substance which when mixed together and exposed to the atmosphere or the soil to which it is applied will readily give off a gas or vapor which causes irritation and inflammation of the breathing passages of the insects subjected to its influence thereby causing the death of the insects.

With the above and other objects in view the invention will be best understood by having reference to the following detailed description and it is to be understood that the various changes as to the proportions of the ingredients herein named may be changed or altered and come within the scope of the invention without departing from the spirit thereof or sacrificing the efficiency of the same and which come within the scope of the appended claim.

The insecticide forming the subject matter of the present invention comprises the following ingredients in or about the proportions named:—

Naphthalin_____ 90%
    Naphthalic acid_____  8%
    Phenol_____  2% and to these ingredients may be added creosote oil or other preservers whose amount varies with the desired use of the ingredients.

The ingredients heretobefore named with the exception of creosote oil are mixed in the proportions mentioned and are fused together with a suitable filler such as ground ashes, manure or sand and the like. This filler before being mixed with the active ingredients is placed into a revolving mixer and the active portions are then caused to flow into the mixer in a fine spray as the mixer revolves so that each and every particle of the filler becomes coated with the active agent. From this it will be seen that each and every grain of the ingredients is active, thus a much more uniform distribution of the insecticide is obtained and also the ultimate separation of the active agent and the filler has been rendered impossible.

From the ingredients hereinbefore named it will be noted that the insecticide consists of certain volatile and soluble substances which when subjected to the action of moisture contained within the soil to which it is applied and the action of the sun's heat absorbed by the soil gives off a gas which is destructive to the insects' lives.

When the ingredients, that is naphthalin, naphthalic acid and phenol have been properly mixed together in the manner aforesaid creosote oil may be added to render the salts contained within the ingredients less volatile and thereby rendering the action of the insecticide less violent. The amount of the creosote oil so added may be varied from 5% to 15% of the salts used, thus enabling the rapidity of the action of the insecticide to be adjusted and in this way preserve the ingredients to suit hot and cold climates. This insecticide may be used by applying it to soil in which the insects live or upon plants or other breeding places and will readily destroy the insects which are full grown or in their larval stage and throughout the continuous evaporation of the volatile substances herein used the insecticide will be injurious to any insects that come within the path of the arising vapors.

The ingredients hereinbefore named have in addition to its insecticidal properties the property of destroying certain plant diseases which are caused by bacteria. From experiments it is found that some plants are subject to particular diseases commonly known as "club foot," and by applying the beforementioned ingredients to the plant affected with such diseases that the fumes or vapor arising from these ingredients will destroy the bacteria of the growing plants, without harming or retarding the growth of the plants in any manner whatsoever.

Having thus fully described my invention, what I claim as new and desire to secure by Letters Patent is:

An insecticide comprising a filler of an inactive agent, an active agent for coating said filler comprising naphthalin 90%, naphthalic acid 8% and phenol 2%, capable when mixed and exposed to the atmosphere of throwing off a vapor and a mineral oil for coating said active agent whereby the evolution of the vapor from the active agent will be retarded for the purpose set forth.

In witness whereof I have hereunto set my hand.

JOHN BRIAN BARRETT.

Witnesses:
 FRED W. HOOVIER,
 JOHN McKERY.